(12) United States Patent
Wu et al.

(10) Patent No.: US 11,837,871 B2
(45) Date of Patent: Dec. 5, 2023

(54) METHOD AND ELECTRONIC DEVICE FOR DISPATCHING POWER GRID

(71) Applicants: TSINGHUA UNIVERSITY, Beijing (CN); STATE GRID CORPORATION OF CHINA, Beijing (CN)

(72) Inventors: Wenchuan Wu, Beijing (CN); Yue Yang, Beijing (CN); Bin Wang, Beijing (CN); Mingjie Li, Beijing (CN)

(73) Assignees: TSINGHUA UNIVERSITY, Beijing (CN); STATE GRID CORPORATION OF CHINA, Beijing (CN)

( * ) Notice: Subject to any disclaimer, the term of this patent is extended or adjusted under 35 U.S.C. 154(b) by 254 days.

(21) Appl. No.: 17/372,977

(22) Filed: Jul. 12, 2021

(65) Prior Publication Data
US 2022/0320868 A1    Oct. 6, 2022

(30) Foreign Application Priority Data
Apr. 1, 2021 (CN) .......................... 202110356994.0

(51) Int. Cl.
*H02J 3/46* (2006.01)
*H02J 3/38* (2006.01)
*G06Q 50/06* (2012.01)

(52) U.S. Cl.
CPC .............. *H02J 3/466* (2020.01); *G06Q 50/06* (2013.01); *H02J 3/381* (2013.01); *H02J 2203/20* (2020.01); *H02J 2300/20* (2020.01)

(58) Field of Classification Search
CPC .... H02J 3/38; H02J 3/381; H02J 3/466; H02J 3/472; H02J 2203/10; H02J 2203/20;
(Continued)

(56) References Cited

U.S. PATENT DOCUMENTS 9,058,443 B2 * 6/2015 Ghosh ..................... G06F 30/13
9,058,444 B2 * 6/2015 Ghosh ..................... G06F 30/18
(Continued)

FOREIGN PATENT DOCUMENTS

CN    109617059 A    *  4/2019    .............. H02J 3/00
CN    111416395 B    *  8/2021    .............. H02J 3/48

OTHER PUBLICATIONS

CN 109617059 A (Apr. 2019) machine translation.*
CN 111416395 B (Aug. 2021) machine translation.*

*Primary Examiner* — M. N. Von Buhr
(74) *Attorney, Agent, or Firm* — Hodgson Russ LLP

(57) ABSTRACT

A method for dispatching a power grid is disclosed. The method includes: obtaining a whole power generation interval scheduled for a cluster of renewable energy stations from a power grid dispatching center; establishing a decomposition model that includes an objection function and constraint conditions; decomposing the whole power generation interval with the decomposition model to obtain each power generation interval of each renewable energy station; and controlling each renewable energy station to generate powers based on each power generation interval. The objection function minimizes a total operating cost in the power grid and includes a renewable energy randomness indicating an actual power generation amount of each renewable energy station. The constraint conditions include a constraint from an installed capacity of each renewable energy station to each power generation interval and a constraint from the whole power generation interval to a sum of power generation intervals of renewable energy stations.

9 Claims, 2 Drawing Sheets

(58) Field of Classification Search
CPC .............. H02J 2300/20; H02J 2300/24; H02J 2300/28; H02J 2300/40; G06Q 10/04; G06Q 10/06; G06Q 50/06; Y02E 40/70; Y02E 60/00; Y04S 10/12; Y04S 10/123; Y04S 10/50; Y04S 40/20; Y04S 50/10; Y04S 50/12
See application file for complete search history.

(56) References Cited

U.S. PATENT DOCUMENTS

| | | | | |
|---|---|---|---|---|
| 9,953,117 | B2* | 4/2018 | Ghosh | G06F 17/10 |
| 10,574,054 | B2* | 2/2020 | Vanouni | G05B 13/021 |
| 10,879,702 | B2* | 12/2020 | Bou-Zeid | G01P 5/14 |
| 10,908,571 | B2* | 2/2021 | Chiang | G05B 19/042 |
| 11,043,818 | B2* | 6/2021 | Wu | H02J 3/38 |
| 11,487,273 | B1* | 11/2022 | Zhao | G05B 19/41885 |
| 11,573,353 | B2* | 2/2023 | Bou-Zeid | H02J 13/00034 |
| 2020/0301384 | A1* | 9/2020 | Chiang | H02J 3/0075 |
| 2020/0341437 | A1* | 10/2020 | Dai | H02J 3/06 |
| 2022/0077686 | A1* | 3/2022 | Ma | H02J 3/381 |
| 2022/0302706 | A1* | 9/2022 | Wu | G06Q 10/04 |

* cited by examiner

METHOD AND ELECTRONIC DEVICE FOR DISPATCHING POWER GRID

CROSS-REFERENCE TO RELATED APPLICATIONS

This application claims priority to Chinese Patent Application Serial No. 202110356994.0, filed on Apr. 1, 2021, the entire disclosure of which is incorporated herein by reference.

FIELD

The disclosure relates to the technical field of power system operation and control, and more particularly to a method and an electronic device for dispatching a power grid, and a storage medium.

BACKGROUND

The economical dispatch for a power grid plays an important role in guiding the operation of the power grid. The power grid dispatch is responsible for developing a power generation schedule for a set of generators, provides a reference for subsequent power generation control, and achieves economic operation under the premise of meeting a power load and ensuring the power grid security.

SUMMARY

The present disclosure provides a method for dispatching a power grid. The power grid includes a cluster of renewable energy stations. The method includes: obtaining a whole power generation interval scheduled for the cluster of renewable energy stations from a power grid dispatching center; establishing a decomposition model that includes an objective function and constraint conditions, wherein the objective function is configured to minimize a total operating cost in the power grid and includes a renewable energy randomness at each renewable energy station, the renewable energy randomness indicating an actual power generation amount of each renewable energy station, and the constraint conditions include a constraint from an installed capacity of each renewable energy station to each power generation interval and a constraint from the whole power generation interval to a sum of power generation intervals of renewable energy stations; decomposing the whole power generation interval with the decomposition model to obtain each power generation interval of each renewable energy station; and controlling each renewable energy station to generate powers based on each power generation interval.

The present disclosure further provides an electronic device for dispatching a power grid. The electronic device includes a processor and a memory. When instructions stored in the memory is executed by the processor, the processor is configured to perform the method for dispatching a power grid as described above.

The present disclosure further provides a non-transitory computer readable storage medium having instructions stored thereon. When the instructions are executed by a processor, the method for dispatching a power grid as described above is performed.

It should be understood that, the above general description and the following detailed description are only exemplary and explanatory, and do not limit the disclosure.

DETAILED DESCRIPTION

Figure 1:
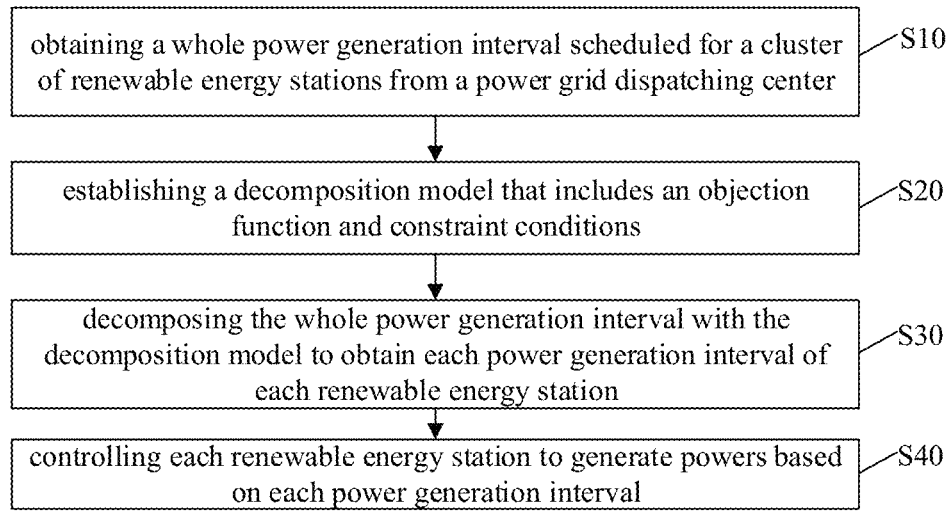
FIG. 1 is a flowchart illustrating a method for dispatching a power grid according to embodiments of the present disclosure.

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Terms used herein in the description of the present disclosure are merely for the purpose of describing specific embodiments, but should not be construed to limit the present disclosure. As used in the description of the disclosure and the appended claims, terms "a," "an," and "the" in singular forms intend to include plural forms, unless clearly indicated in the context otherwise. It should also be understood that, as used herein, term "and/or" represents and contains any one and all possible combinations of one or more listed items.

It should be understood that, although terms such as "first", "second" and "third" may be used herein to describe various objects, these objects should not be limited by these terms. These terms are only used for distinguishing one object from another object. For example, a first object may also be called as a second object, and similarly, the second object may also be called as the first object, without departing from the scope of the present disclosure. Depending on the context, the term "if" may be understood to mean "when" or "upon" or "in response to the determination of".

In recent years, more and more renewable energy stations are access to the power grid in a form of a cluster. It is necessary to decompose a whole dispatch schedule for the cluster into a plurality of dispatch schedules for a plurality of renewable energy stations. As an actual power generation output from each renewable energy station is random, it is necessary to introduce an optimization algorithm in consideration of the randomness or uncertainty when the whole dispatch schedule for the cluster is decomposed into each dispatch schedule for each station.

At present, a method for decomposing the dispatch schedule commonly used includes performing a direct distribution in proportion based on the predicted power generation of each station, which has a disadvantage that the uncertainty of renewable energy is not considered, and may lead to an unreasonable distribution for the whole dispatch schedule and be not conducive to effective consumption of renewable energies.

To solve the problem in the related art that due to no consideration of the uncertainty of renewable energy, it may cause an unreasonable distribution based on the predicted power generation of each renewable energy station and an ineffective consumption of renewable energies, the disclosure provides a method and an electronic device for dispatching a power grid, and a storage medium.

With the method for dispatching a power grid according to the disclosure, the uncertainty of renewable energies is indicated by probability information of renewable energies, the renewable energy stations are dispatched to generate powers by solving a linear optimization problem, thereby achieving the dispatch schedule decomposition. In addition, the fluctuation of renewable energy stations in the power grid is taken into consideration, which promotes the effective consumption of renewable energies and ensures the power grid security. The method in the disclosure is suitable for application in scenarios such as the economic dispatch in the power grid.

For example, the method may include the following actions (1)-(4).

(1) a whole generation power interval scheduled for a renewable energy cluster is obtained from a power grid dispatching center, a lower bound of the whole generation power interval of the renewable energy cluster is denoted as $R^{lb}$ and an upper bound of the whole generation power interval of the renewable energy cluster is denoted as $R^{ub}$;

(2) it is established that a model for decomposing the power generation interval considering a renewable energy randomness at each renewable energy station.

(3) an equivalent nonlinear programming problem in action (2) above is solved with a linearization method.

(4) an upper bound and a lower bound of a power generation interval scheduled for each renewable energy station is obtained from the optimal solution in step (3). That is, the dispatch schedule for each renewable energy station in the renewable energy cluster is obtained, thereby realizing dispatching the power generation in the power grid.

In an embodiment of the present disclosure, the action (2) above specifically includes the following actions (2-1) and (2-2).

(2-1) it is determined that an objective function of the model for decomposing the whole power generation interval. The decomposition of the whole dispatch schedule aims at minimizing the total operating cost in the power grid. The total cost is a sum of an over-generation cost expectation and an under-generation cost expectation. The over-generation cost expectation refers to an actual power generation of a renewable energy station being greater than the upper bound of the power generation interval. The under-generation cost expectation refers to the actual power generation of the renewable energy station being less than the lower bound of the power generation interval. The total cost of the power grid operation is expressed by:

$$\min \sum_{i=1}^{N} [E(UG_i) + E(OG_i)]$$

where min represents a minimization, N represents a number of renewable energy stations participating in the decomposition of the whole power generation interval, $E(UG_i)$ represents a mathematical expectation of an under-generation cost of the i-th renewable energy station, and $E(OG_i)$ represents a mathematical expectation of an over-generation cost of the i-th renewable energy station.

The mathematical expectation $E(UG_i)$ of the under-generation cost of the i-th renewable energy station is expressed by:

$$E(OG_i) = \int_{r_i^{ub}}^{r_i^{max}} (\tilde{r}_{i,av} - r_i^{ub}) PDF_i(\tilde{r}_{i,av}) d\tilde{r}_{i,av}$$

where $r_i^{lb}$ represents a lower bound of a power generation interval of the i-th renewable energy station, $\bar{r}_{i,av}$, as a random variable, represents an actual power generation amount of the i-th renewable energy station, $PDF_i$ represents a probability density function as the actual power generation amount of the i-th renewable energy station, $d\bar{r}_{i,av}$ represents a differential form of the random variable $\bar{r}_{i,av}$ indicating the actual power generation amount of the i-th renewable energy station, and $$\int_0^{r_i^{lb}}$$

represents a definite integral calculation from 0 to the lower bound of the power generation interval of the i-th renewable energy station.

The mathematical expectation $E(OG_i)$ of the over-generation cost of the i-th renewable energy station is expressed by:

$$E(UG_i) = \int_0^{r_i^{lb}} (r_i^{lb} - \tilde{r}_{i,av}) PDF_i(\tilde{r}_{i,av}) d\tilde{r}_{i,av}$$

where $r_i^{ub}$ represents an upper bound of a power generation interval of the i-th renewable energy station, $r_i^{max}$ represents an installed capacity of the i-th renewable energy station, $$\int_{r_i^{ub}}^{r_i^{max}}$$

represents a definite integral calculation from the upper bound of the power generation interval of the i-th renewable energy station to the installed capacity of the i-th renewable energy station.

(2-2) constraint conditions of the model for decomposing the power generation interval is determined.

In an embodiment of the present disclosure, the action (2-2) above specifically includes the following actions (2-2-1) and (2-2-2).

(2-2-1) a constraint for the generation power interval of the renewable energy station is:

$$0 \leq r_i^{lb} \leq r_i^{ub} \leq r_i^{max}$$

where $r_i^{lb}$ represents the lower bound of the power generation interval of the renewable energy station, $r_i^{ub}$ represents the upper bound of the power generation interval of the renewable energy station, and $r_i^{max}$ represents the installed capacity of the renewable energy station.

(2-2-2) a constraint for the generation power interval of the renewable energy cluster is:

$$\sum_{i=1}^{N} r_i^{lb} \geq R^{lb}$$

$$\sum_{i=1}^{N} r_i^{ub} \leq R^{ub}$$

where $R^{lb}$ represents the lower bound of the whole power generation interval of the renewable energy cluster, and $R^{ub}$ represents the upper bound of the whole power generation interval of the renewable energy cluster.

In an embodiment of the present disclosure, the action (3) above specifically includes the following actions (3-1) and (3-2).

(3-1) a linearized approximate of the objective function in step (2-1) is performed, and its specific form is as follows:

$$\min \sum_{i=1}^{N} [s_i + t_i]$$

$$s_i \geq E(UG_i)_{r_i^{lb}=r_{i,k}} + [CDF_i(r_{i,k}) - CDF_i(0)](r_i^{lb} - r_{i,k})$$

$$(k = 1, 2, \ldots, K)$$

$$t_i \geq E(OG_i)_{r_i^{ub}=r_{i,k}} + [CDF_i(r_{i,k}) - CDF_i(r_i^{max})](r_i^{ub} - r_{i,k})$$

$$(k = 1, 2, \ldots, K)$$

where $s_i$ represents a linearized approximate or the mathematical expectation $E(UG_i)$ of the under-generation cost of the i-th renewable energy station, $t_i$ represents a linearized approximate of the mathematical expectation $E(OG_i)$ of the over-generation cost of the i-th renewable energy station; k represents a serial number of linearized sampling points, K represents a number of linearized sampling points, $r_{i,k}$ represents a value of the k-th linearized sampling point of the i-th renewable energy station, and $$E(UG_i)_{r_i^{lb}=r_{i,k}}$$

represents a numerical value of $E(UG_i)$ calculated when the lower bound $r_i^{lb}$ of the power generation interval of the i-th renewable energy station equals to $r_{i,k}$, $$E(OG_i)_{r_i^{ub}=r_{i,k}}$$

represents a numerical value of $E(OG_i)$ calculated when the upper bound $r_i^{ub}$ of the power generation interval of the i-th renewable energy station equals to $r_{i,k}$, and $CDF_i$ represents a cumulative probability density function as the actual power generation amount of the i-th renewable energy station.

(3-2) the model for decomposing the power generation interval, composed of the objective function in step (3-1) and the constraint conditions in step (2-2), is solved with an existing linear programming solution method, to obtain an optimal solution of the model for decomposing the power generation interval.

FIG. 1 is a flowchart illustrating a method for dispatching a power grid according to embodiments of the present disclosure. The power grid includes a cluster of renewable energy stations. The method is executed by an electronic device. As illustrated in FIG. 1, the method includes the following blocks.

At block 10, a whole power generation interval scheduled for the cluster of renewable energy stations is obtained from a power grid dispatching center.

In an embodiment, a whole dispatch schedule for the cluster of renewable energy stations is pre-stored at the power grid dispatching center, and the whole dispatch schedule includes a whole power generation interval scheduled for the renewable energy station cluster. The whole power generation interval has an upper bound denoted as $R^{ub}$ and a lower bound denoted as $R^{lb}$. At block 20, a decomposition model including an objective function and constraint conditions is established. The objective function is configured to minimize a total operating cost in the power grid and includes a renewable energy randomness at each renewable energy station. The renewable energy randomness indicates an actual power generation amount of each renewable energy station. The constraint conditions include a constraint from an installed capacity of each renewable energy station to each power generation interval and a constraint from the whole power generation interval to a sum of power generation intervals of renewable energy stations.

In an embodiment, the decomposition model is constructed in advance in consideration of a randomness renewable energy at each renewable energy station. The objective function refers to a minimization of the total cost of all renewable energy stations operating in the power grid. In other words, the method for dispatching a power grid according to the present disclosure aims at reducing the total cost in the power grid by reasonably dispatching the power generation interval of all the renewable energy stations. In particular, the total cost is a sum of an over-generation cost expectation and an under-generation cost expectation. The over-generation cost expectation refers to an actual power generation amount of a renewable energy station being greater than an upper bound of the corresponding power generation interval of the renewable energy station. The under-generation cost expectation refers to an actual power generation amount of a renewable energy station being less than a lower bound of the corresponding power generation interval of the renewable energy station.

In an embodiment, the objective function indicating the total cost is expressed by:

$$\min \sum_{i=1}^{N} [E(UG_i) + E(OG_i)] \quad \text{(i)}$$

where N represents a number of renewable energy stations, $E(UG_i)$ represents a mathematical expectation of an under-generation cost of the i-th renewable energy station, and $E(OG_i)$ represents a mathematical expectation of an over-generation cost of the i-th renewable energy station.

In an embodiment, the randomness at each renewable energy station is included in the mathematical expectations $E(UG_i)$ and $E(OG_i)$, which are respectively expressed by:

$$E(UG_i) = \int_0^{r_i^{lb}} (r_i^{lb} - \tilde{r}_{i,av}) PDF_i(\tilde{r}_{i,av}) d\tilde{r}_{i,av} \quad \text{(ii)}$$

$$E(OG_i) = \int_{r_i^{ub}}^{r_i^{max}} (\bar{r}_{i,av} - r_i^{ub}) PDF_i(\bar{r}_{i,av}) d\bar{r}_{i,av} \quad \text{(iii)}$$

where $r_i^{lb}$ represents a lower bound of a power generation interval of the i-th renewable energy station, $\bar{r}_{i,av}$, as a random variable, represents an actual power generation amount of the i-th renewable energy station, $PDF_i$ represents a probability density function as the actual power generation amount of the i-th renewable energy station, $d\bar{r}_{i,av}$ represents a differential form of the random variable $\bar{r}_{i,av}$ and $$\int_0^{r_i^{lb}}$$

represents a definite integral calculation from 0 to the lower bound of the power generation interval of the i-th renewable energy station.

where $r_i^{ub}$ represents an upper bound of a power generation interval of the i-th renewable energy station, $r_i^{max}$ represents an installed capacity of the i-th renewable energy station, and $$\int_{r_i^{ub}}^{r_i^{max}}$$

represents a definite integral calculation from the upper bound of the power generation interval to the installed capacity of the i-th renewable energy station.

In an embodiment, the above constraint conditions may be expressed by:

$$0 \leq r_i^{lb} \leq r_i^{ub} \leq r_i^{max} \quad \text{(iv)}$$

$$\sum_{i=1}^{N} r_i^{lb} \geq R^{lb} \quad \text{(v)}$$

$$\sum_{i=1}^{N} r_i^{ub} \leq R^{ub}$$

where $r_i^{lb}$ represents a lower bound of a power generation interval of the i-th renewable energy station, $r_i^{ub}$ represents an upper bound of a power generation interval of the i-th renewable energy station, $r_i^{max}$ represents an installed capacity of the i-th renewable energy station, $R^{lb}$ represents a lower bound of the whole power generation interval and $R^{ub}$ represents an upper bound of the whole power generation interval.

At block 30, the whole power generation interval is decomposed with the decomposition model to obtain each power generation interval of each renewable energy station.

At block 40, each renewable energy station is controlled to generate powers based on each power generation interval.

In an embodiment, the whole power generation interval is decomposed with the decomposition model by: solving the objective function based on the constraint conditions with a linearization method, to obtain an optimal solution. The upper bound and lower bound of each renewable energy station are extracted from the optimal solution.

With the method for dispatching a power grid according to the embodiment of the disclosure, the whole power generation interval scheduled for the renewable energy station cluster may be obtained from the power grid dispatching center; the decomposition model including the objective function and constraint conditions may be established in consideration of the renewable energy randomness at each renewable energy station; the whole power generation interval scheduled may be decomposed with the decomposition model to obtain each power generation interval of each renewable energy station; and each renewable energy station may be controlled to generate powers based on each power generation interval. In this way, the fluctuation at each renewable energy station in the power grid is taken into consideration, which promotes the effective consumption of renewable energy and ensures the power grid security.

Figure 2:
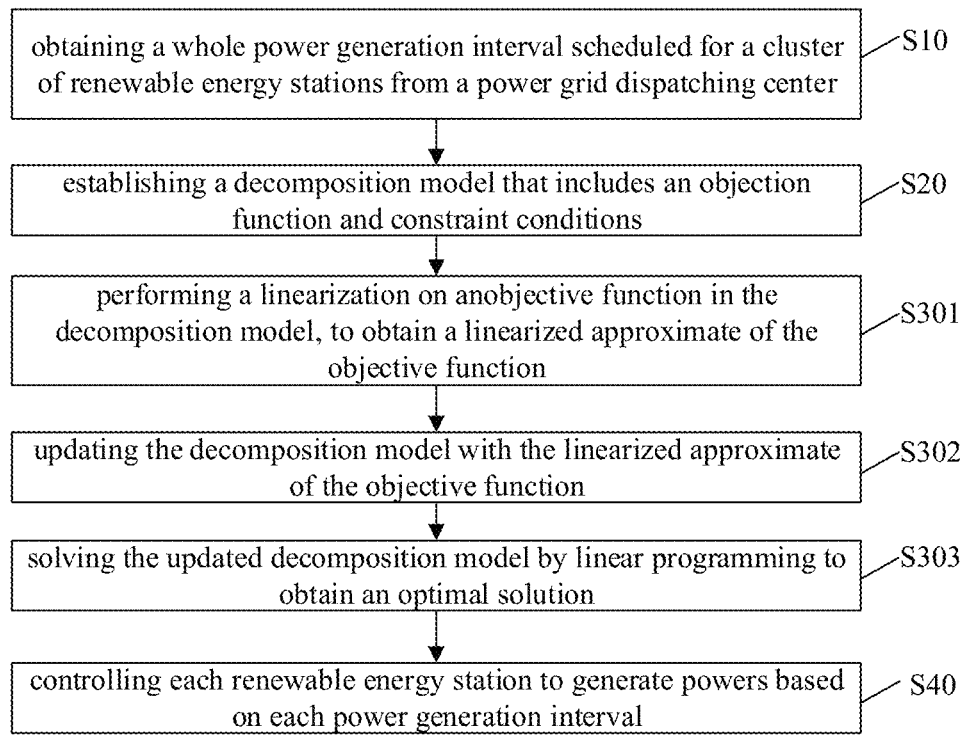
FIG. 2 is a flowchart illustrating another method for dispatching a power grid according to embodiments of the present disclosure.

FIG. 2 is a flowchart illustrating another method for dispatching a power grid according to embodiments of the present disclosure. As illustrated in FIG. 2, the method includes the following blocks.

At block 10, a whole power generation interval scheduled for the cluster of renewable energy stations is obtained from a power grid dispatching center.

At block 20, a decomposition model including an objective function and constraint conditions is established. The objective function is configured to minimize a total operating cost in the power grid and includes a renewable energy randomness at each renewable energy station. The renewable energy randomness indicates an actual power generation amount of each renewable energy station. The constraint conditions include a constraint from an installed capacity of each renewable energy station to each power generation interval and a constraint from the whole power generation interval to a sum of power generation intervals of renewable energy stations.

The specific implementations on blocks S10-S20 may refer to the descriptions in the above method embodiment, which will not be repeated herein.

At block 301, a linearization is performed on the objective function in the decomposition model, to obtain a linearized approximate of the objective function.

In an embodiment, since the above decomposition model involves in a non-linear programming problem, the linearization method in the present disclosure is adopted to solve the objective function in the decomposition model.

In particular, a linearized approximate $s_i$ of the mathematical expectation $E(UG_i)$ of the under-generation cost of the i-th renewable energy station is obtained by the formula:

$$s_i \geq E(UG_i)_{r_i^{lb} = r_{i,k}} + [CDF_i(r_{i,k}) - CDF_i(0)](r_i^{lb} - r_{i,k}) \quad \text{(vi)}$$

$$(k = 1, 2, \ldots, K)$$

a linearized approximate $t_i$ of the mathematical expectation $E(OG_i)$ of the over-generation cost of the i-th renewable energy station is obtained by the formula:

$$t_i \geq E(OG_i)_{r_i^{ub} = r_{i,k}} + [CDF_i(r_{i,k}) - CDF_i(r_i^{max})](r_i^{ub} - r_{i,k}) \quad \text{(vii)}$$

$$(k = 1, 2, \ldots, K)$$

k represents a serial number of linearized sampling points, K represents a number of linearized sampling points, $r_{i,k}$ represents a value of the k-th linearized sampling point at the i-th renewable energy station, and $E(UG_i)_{r_i^{lb}=r_{i,k}}$ represents a numerical value of $E(UG_i)$ calculated when a lower bound $r_i^{lb}$ of a power generation interval of the i-th renewable energy station equals to $r_{i,k}$, $E(OG_i)_{r_i^{ub}=r_{i,k}}$ represents a numerical value of $E(OG_i)$ calculated when an upper bound $r_i^{ub}$ of a power generation interval of the i-th renewable energy station equals to $r_{i,k}$, and $CDF_i$ represents a cumulative probability density function as an actual power generation amount of the i-th renewable energy station.

Then, the above objective function presented in the formula (i) in block S20 may be simplified as:

$$\min \sum_{i=1}^{N} [s_i + t_i] \qquad \text{(viii)}$$

At block 302, the decomposition model is updated with the linearized approximate of the objective function.

At block 303, the updated decomposition model is solved by linear programming to obtain an optimal solution. In an embodiment, the linearized approximate of the objective function in the formula (viii) is solved in an existing linear programming way based on the constrain conditions in the formula (iv) and (v) to obtain an optimal solution. The optimal solution may include the upper bound $r_i^{ub}$ and the lower bound $r_i^{lb}$ of the i-th renewable energy station, i.e., a set of upper bound and lower bound at each renewable energy station.

With the method for dispatching a power grid according to the embodiment of the disclosure, the whole power generation interval scheduled for the renewable energy station cluster may be obtained from the power grid dispatching center; the decomposition model including the objective function and constraint conditions may be established in consideration of the renewable energy randomness at each renewable energy station; the decomposition model may be updated with the linearized approximate of the objective function and solved by linear programming to obtain an optimal solution; and each renewable energy station may be controlled to generate powers based on each power generation interval. In this way, the fluctuation at each renewable energy station in the power grid is taken into consideration, which promotes the effective consumption of renewable energy and ensures the power grid security.

Figure 3:
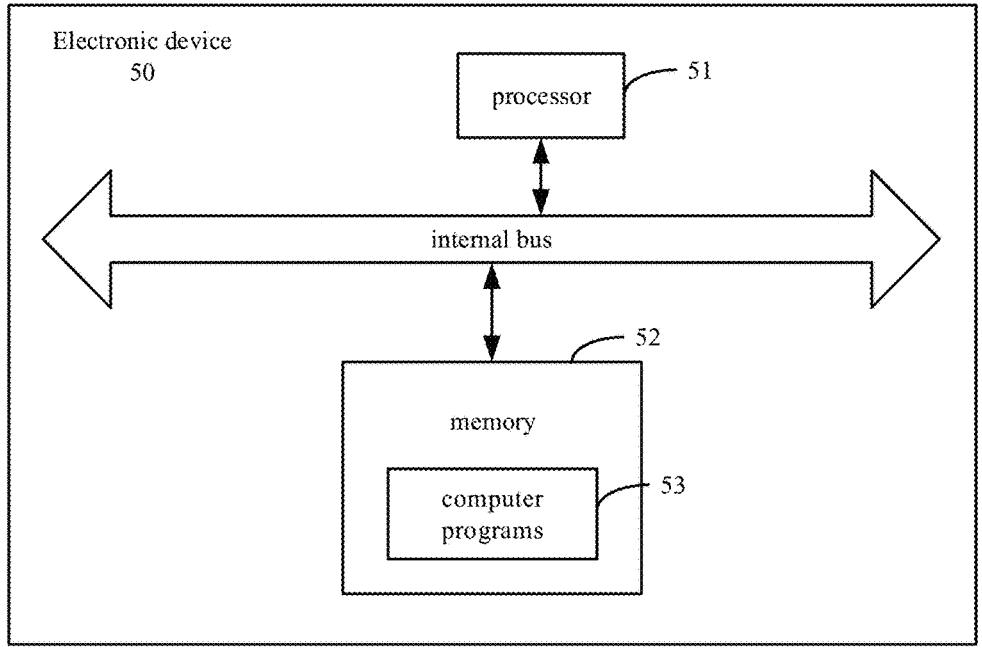
FIG. 3 is a block diagram illustrating an electronic device according to some embodiments of the present disclosure.

FIG. 3 is a block diagram illustrating an electronic device 50 according to an example embodiment of the present disclosure. The electronic device 50 includes a processor 51 and a memory 52. The memory 52 is configured to store executable instructions. The memory 52 includes computer programs 53. The processor 51 is configured to execute blocks of the above-mentioned method.

The processor 51 is configured to execute the computer programs 53 included in the memory 52. The processor 51 may be a central processing unit (CPU) or another a general-purpose processor, a digital signal processor (DSP), an application specific integrated circuit (ASIC), a field-programmable gate array (FPGA), another programmable logic device, a discrete gate, a transistor logic device, a discrete hardware component, and the like. The general-purpose processor may be a microprocessor or any conventional processor.

The memory 52 is configured to store computer programs related to the method. The memory 52 may include at least one type of storage medium. The storage medium includes a flash memory, a hard disk, a multimedia card, a card-type memory (such as, a SD (secure digital) or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. The device may cooperate with a network storage device that performs a storage function of the memory by a network connection. The memory 52 may be an internal storage unit of the device 50, such as a hard disk or a memory of the device 50. The memory 52 may also be an external storage device of the device 50, such as a plug-in hard disk, a smart media card (SMC), a secure digital (SD) card, a flash card, disposed on the device 50. Further, the memory 52 may also include both the internal storage unit of the device 50 and the external storage device. The memory 52 is configured to store the computer program 53 and other programs and data required by the device. The memory 52 may also be configured to temporarily store data that has been output or will be output.

The various embodiments described herein may be implemented by using the computer readable medium such as computer software, hardware, or any combination thereof. For a hardware implementation, embodiments described herein may be implemented by using at least one of: an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. For a software implementation, an implementation such as a procedure or a function may be implemented with a separate software module that allows at least one function or operation to be performed. Software codes may be implemented by a software application (or program) written in any suitable programming language, and the software codes may be stored in the memory and executed by the controller.

The electronic device 50 includes, but is not limited to, a mobile terminal, an ultra-mobile personal computer device, a server, and other electronic device with a computing function. (1) The mobile terminal is characterized by having a function of mobile communication and aiming at providing a voice and data communication. Such mobile terminal includes a smart phone (such as iPhone), a multimedia phone, a functional phone, and a low-end phone. (2) The ultra-mobile personal computer device belongs to a category of personal computer, which has a computing and processing function, and generally has a feature of mobile Internet access. Such terminal includes a PDA (personal digital assistant), a MID (mobile Internet device) and a UMPC (ultra mobile personal computer) devices, such as an iPad. (3) The server provides a computing service. A composition of the server includes a processor, a hard disk, a memory, a system bus, etc. The server is similar to the general computer architecture, but because the server only provides a highly reliable service, it requires a higher processing capacity, stability, reliability, security, scalability and manageability. (4) Other electronic device with the computing function may include, but be not limited to, the processor 51 and the memory 52. It may be understood by the skilled in the art that, FIG. 3 is merely an example of the electronic device 50, and does not constitute a limitation of the electronic device 50. The electronic device 50 may include more or less components than illustrated, some combined components, or different components. For example, the electronic device may also include an input device, an output device, a network access device, a bus, a camera device, etc.

The implementation procedure of the functions of each unit in the above device may refer to the implementation procedure of the corresponding actions in the above method, which is not elaborated here.

In some embodiment, there is also provided a storage medium including instructions, such as the memory 52 including instructions. The above instructions may be executed by the processor 51 of the electronic device 50 to perform the above method. In some embodiments, the storage medium may be a non-transitory computer readable storage medium. For example, the non-transitory computer readable storage medium may include the ROM, the random-access memory (RAM), the CD-ROM (compact disc read-only memory), a magnetic tape, a floppy disk, optical data storage device, etc.

A non-transitory computer readable storage medium is provided. When instructions stored in the storage medium are executed by a processor of a terminal, the terminal is enabled to execute the above method for dispatching a power grid.

In some embodiments, there is also provided a computer program product including executable program codes. The program codes are configured to execute any of the above embodiments of the method when executed by the above device.

Figure 4:
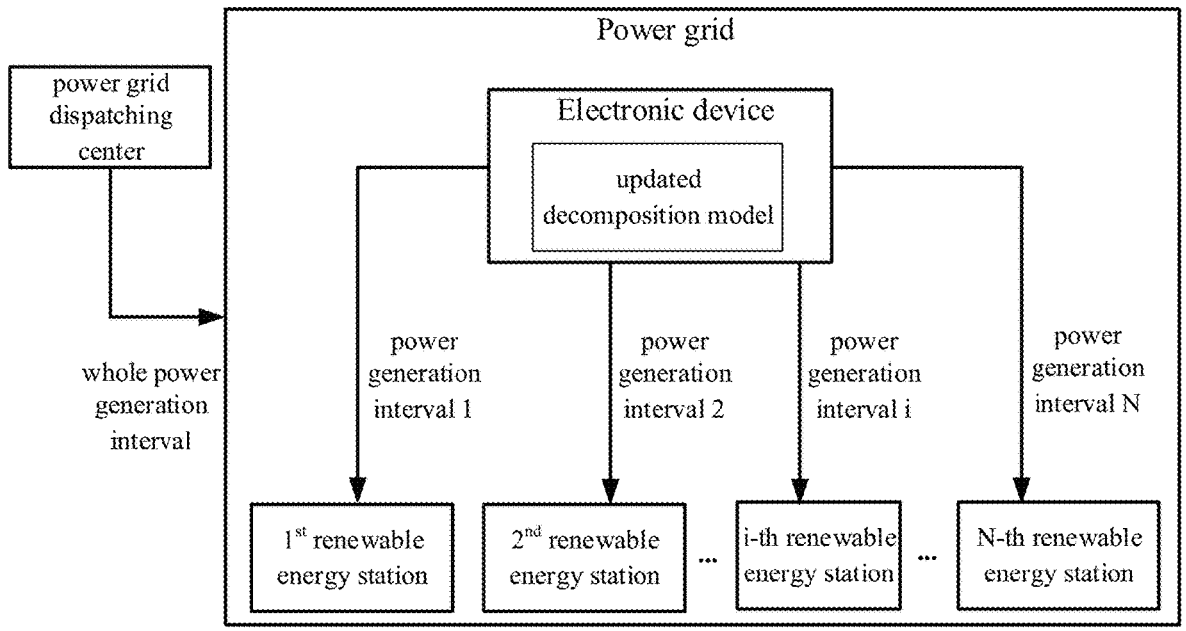
FIG. 4 is a block diagram illustrating a power grid operating with a power grid dispatching center according to embodiments of the present disclosure.

FIG. 4 is a block diagram illustrating a power grid operating with a power grid dispatching center according to embodiments of the present disclosure. The power grid comprises a cluster of renewable energy stations (1 to N). The above-mentioned i-th renewable energy station is any one of N renewable energy stations, where $1 \leq i \leq N$. Each of the N renewable energy station has a corresponding power generation interval. The power grid dispatching center may send the whole power generation interval scheduled for all the renewable energy stations in the power grid to an electronic device, so as to calculate a power generation interval of each renewable energy station. Based on the calculated power generation interval of each renewable energy station, the power generation in the power grid may be accordingly dispatched as described in the above embodiments of the present disclosure. Other embodiments of the disclosure may readily be apparent to the skilled in the art after consideration of the specification and practice of the disclosure disclosed herein. This disclosure is intended to cover any modification, use or adaptation of the disclosure, which follows the general principles of the disclosure and includes common knowledge or conventional technical means in the skilled in the art not disclosed in the disclosure. The specification and examples are merely exemplary, with the true scope and the spirit of the disclosure being indicated by the following claims.

It should be understood that, the present disclosure is not limited to a precise structure described above and illustrated in the accompanying drawings, and various modifications and changes may be made without departing from the scope of the disclosure. The scope of the disclosure is limited merely by the appended claims.

What is claimed is:

1. A method for dispatching a power grid, the power grid comprising a cluster of renewable energy stations, the method comprising:

obtaining a whole power generation interval scheduled for the cluster of renewable energy stations from a power grid dispatching center;

establishing a decomposition model that includes an objective function and constraint conditions;

decomposing the whole power generation interval with the decomposition model to obtain a power generation interval of each renewable energy station; and controlling each renewable energy station to generate powers based on the power generation interval of each renewable energy station;

wherein the objective function is expressed by:

$$\min \sum_{i=1}^{N} [E(UG_i) + E(OG_i)]$$

$$E(UG_i) = \int_0^{r_i^{lb}} (r_i^{lb} - \tilde{r}_{i,av}) PDF_i(\tilde{r}_{i,av}) d\tilde{r}_{i,av}$$

$$E(OG_i) = \int_{r_i^{ub}}^{r_i^{max}} (\tilde{r}_{i,av} - r_i^{ub}) PDF_i(\tilde{r}_{i,av}) d\tilde{r}_{i,av}$$

where N represents a number of renewable energy stations, $E(UG_i)$ represents a mathematical expectation of an under-power generation cost of an i-th renewable energy station, and $E(OG_i)$ represents a mathematical expectation of an over-generation cost of the i-th renewable energy station, where $r_i^{lb}$ represents a lower bound of a power generation interval of the i-th renewable energy station, $\tilde{r}_{i,av}$, as a random variable, represents an actual power generation amount of the i-th renewable energy station, $PDF_i$ represents a probability density function of the actual power generation amount of the i-th renewable energy station, $d\tilde{r}_{i,av}$ represents a differential form of the random variable $\tilde{r}_{i,av}$ and $$\int_0^{r_i^{lb}}$$

represents a definite integral calculation from 0 to the lower bound $r_i^{lb}$, where $r_i^{ub}$ represents an upper bound of the power generation interval of the i-th renewable energy station, $r_i^{max}$ represents an installed capacity of the i-th renewable energy station, and $$\int_{r_i^{ub}}^{r_i^{max}}$$

represents a definite integral calculation from the upper bound $r_i^{ub}$ to the installed capacity $r_i^{max}$;

wherein the constraint conditions are expressed by:

$$0 \leq r_i^{lb} \leq r_i^{ub} \leq r_i^{max}$$

$$\sum_{i=1}^{N} r_i^{lb} \geq R^{lb}$$

$$\sum_{i=1}^{N} r_i^{ub} \leq R^{ub}$$

where $R^{lb}$ represents a lower bound of the whole power generation interval and $R^{ub}$ represents an upper bound of the whole power generation interval.

2. The method of claim 1, wherein decomposing the whole power generation interval with the decomposition model comprises:
performing a linearization on the objective function in the decomposition model, to obtain a linearized approximate of the objective function;
updating the decomposition model with the linearized approximate of the objective function; and
solving the updated decomposition model by linear programming to obtain an upper bound and a lower bound of the power generation interval of each renewable energy station.

3. The method of claim 2, wherein the linearized approximate of the objective function is expressed by:

$$\min \sum_{i=1}^{N} [s_i + t_i]$$

$$s_i \geq E(UG_i)_{r_i^{lb}=r_{i,k}} + [CDF_i(r_{i,k}) - CDF_i(0)](r_i^{lb} - r_{i,k})$$

$$(k = 1, 2, \ldots, K)$$

$$t_i \geq E(OG_i)_{r_i^{ub}=r_{i,k}} + [CDF_i(r_{i,k}) - CDF_i(r_i^{max})](r_i^{ub} - r_{i,k})$$

$$(k = 1, 2, \ldots, K)$$

where $s_i$ represents a linearized approximate of the mathematical expectation $E(UG_i)$ of the under-generation cost of the i-th renewable energy station, $t_i$ represents a linearized approximate of the mathematical expectation $E(OG_i)$ of the over-generation cost of the i-th renewable energy station;
k represents a serial number of linearized sampling points, K represents a number of linearized sampling points, $r_{i,k}$ represents a value of a k-th linearized sampling point at the i-th renewable energy station, and $$E(UG_i)_{r_i^{lb}=r_{i,k}}$$

represents a numerical value of $E(UG_i)$ calculated when a lower bound $r_i^{lb}$ of a power generation interval of the i-th renewable energy station equals to $r_{i,k}$, $$E(OG_i)_{r_i^{ub}=r_{i,k}}$$

represents a numerical value of $E(OG_i)$ calculated when an upper bound $r_i^{ub}$ of a power generation interval of the i-th renewable energy station equals to $r_{i,k}$, and $CDF_i$ represents a cumulative probability density function as an actual power generation amount of the i-th renewable energy station.

4. An electronic device for dispatching a power grid, the power grid comprising a cluster of renewable energy stations, the device comprising:
a processor; and
a memory, having instructions stored thereon and executable by the processor;
wherein when the instructions are executed by the processor, the processor is configured to:
obtain a whole power generation interval scheduled for the cluster of renewable energy stations from a power grid dispatching center;
establish a decomposition model that includes an objective function and constraint conditions;
decompose the whole power generation interval with the decomposition model to obtain a power generation interval of each renewable energy station; and
control each renewable energy station to generate powers based on the power generation interval of each renewable energy station;
wherein the objective function is expressed by:

$$\min \sum_{i=1}^{N} [E(UG_i) + E(OG_i)]$$

$$E(UG_i) = \int_0^{r_i^{lb}} (r_i^{lb} - \tilde{r}_{i,av}) PDF_i(\tilde{r}_{i,av}) d\tilde{r}_{i,av}$$

$$E(OG_i) = \int_{r_i^{ub}}^{r_i^{max}} (\tilde{r}_{i,av} - r_i^{ub}) PDF_i(\tilde{r}_{i,av}) d\tilde{r}_{i,av}$$

where N represents a number of renewable energy stations, $E(UG_i)$ represents a mathematical expectation of an under-power generation cost of an i-th renewable energy station, and $E(OG_i)$ represents a mathematical expectation of an over-generation cost of the i-th renewable energy station,
where $r_i^{lb}$ represents a lower bound of a power generation interval of the i-th renewable energy station, $\tilde{r}_{i,av}$, as a random variable, represents an actual power generation amount of the i-th renewable energy station, $PDF_i$ represents a probability density function of the actual power generation amount of the i-th renewable energy station, $d\tilde{r}_{i,av}$ represents a differential form of the random variable $\tilde{r}_{i,av}$ and $$\int_0^{r_i^{lb}}$$

represents a definite integral calculation from 0 to the lower bound $r_i^{lb}$,
where $r_i^{ub}$ represents an upper bound of the power generation interval of the i-th renewable energy station, $r_i^{max}$ represents an installed capacity of the i-th renewable energy station, and $$\int_{r_i^{ub}}^{r_i^{max}}$$

represents a definite integral calculation from the upper bound $r_i^{ub}$ to the installed capacity $r_i^{max}$;
  wherein the constraint conditions are expressed by:

$$0 \leq r_i^{lb} \leq r_i^{ub} \leq r_i^{max}$$

$$\sum_{i=1}^{N} r_i^{lb} \geq R^{lb}$$

$$\sum_{i=1}^{N} r_i^{ub} \leq R^{ub}$$

where $R^{lb}$ represents a lower bound of the whole power generation interval and $R^{ub}$ represents an upper bound of the whole power generation interval.
  5. The electronic device of claim 4, wherein the processor is further configured to:
  perform a linearization on the objective function in the decomposition model, to obtain a linearized approximate of the objective function;
  update the decomposition model with the linearized approximate of the objective function; and
  solve the updated decomposition model by linear programming to obtain an upper bound and a lower bound of the power generation interval of each renewable energy station.
  6. The electronic device of claim 5, wherein the linearized approximate of the objective function is expressed by:

$$\min \sum_{i=1}^{N} [s_i + t_i]$$

$$s_i \geq E(UG_i)_{r_i^{lb} = r_{i,k}} + [CDF_i(r_{i,k}) - CDF_i(0)](r_i^{lb} - r_{i,k})$$

$$(k = 1, 2, \ldots, K)$$

$$t_i \geq E(OG_i)_{r_i^{ub} = r_{i,k}} + [CDF_i(r_{i,k}) - CDF_i(r_i^{max})](r_i^{ub} - r_{i,k})$$

$$(k = 1, 2, \ldots, K)$$

where $s_i$ represents a linearized approximate of the mathematical expectation $E(UG_i)$ of the under-generation cost of the i-th renewable energy station, $t_i$ represents a linearized approximate of the mathematical expectation $E(OG_i)$ of the over-generation cost of the i-th renewable energy station;
  k represents a serial number of linearized sampling points, K represents a number of linearized sampling points, $r_{i,k}$ represents a value of a k-th linearized sampling point at the i-th renewable energy station, and $$E(UG_i)_{r_i^{lb} = r_{i,k}}$$

represents a numerical value of $E(UG_i)$ calculated when a lower bound $r_i^{lb}$ of a power generation interval of the i-th renewable energy station equals to $r_{i,k}$, $$E(OG_i)_{r_i^{ub} = r_{i,k}}$$

represents a numerical value of $E(OG_i)$ calculated when an upper bound $r_i^{ub}$ of a power generation interval of the i-th renewable energy station equals to $r_{i,k}$, and $CDF_i$ represents a cumulative probability density function as an actual power generation amount of the i-th renewable energy station.

7. A non-transitory computer readable storage medium, having instructions stored thereon, wherein when the instructions are executed by a processor, a method for dispatching a power grid is performed, the method comprising:
  obtaining a whole power generation interval scheduled for the cluster of renewable energy stations from a power grid dispatching center;
  establishing a decomposition model that includes an objective function and constraint conditions;
  decomposing the whole power generation interval with the decomposition model to obtain a power generation interval of each renewable energy station; and
  controlling each renewable energy station to generate powers based on the power generation interval of each renewable energy station;
  wherein the objective function is expressed by:

$$\min \sum_{i=1}^{N} [E(UG_i) + E(OG_i)]$$

$$E(UG_i) = \int_0^{r_i^{lb}} (r_i^{lb} - \tilde{r}_{i,av}) PDF_i(\tilde{r}_{i,av}) d\tilde{r}_{i,av}$$

$$E(OG_i) = \int_{r_i^{ub}}^{r_i^{max}} (\tilde{r}_{i,av} - r_i^{ub}) PDF_i(\tilde{r}_{i,av}) d\tilde{r}_{i,av}$$

where N represents a number of renewable energy stations, $E(UG_i)$ represents a mathematical expectation of an under-power generation cost of an i-th renewable energy station, and $E(OG_i)$ represents a mathematical expectation of an over-generation cost of the i-th renewable energy station,
  where $r_i^{lb}$ represents a lower bound of a power generation interval of the i-th renewable energy station, $\tilde{r}_{i,av}$, as a random variable, represents an actual power generation amount of the i-th renewable energy station, $PDF_i$ represents a probability density function of the actual power generation amount of the i-th renewable energy station, $d\tilde{r}_{i,av}$ represents a differential form of the random variable $\tilde{r}_{i,av}$ and $$\int_0^{r_i^{lb}}$$

represents a definite integral calculation from 0 to the lower bound $r_i^{lb}$,
  where $r_i^{ub}$ represents an upper bound of the power generation interval of the i-th renewable energy station, $r_i^{max}$ represents an installed capacity of the i-th renewable energy station, and $$\int_{r_i^{ub}}^{r_i^{max}}$$

represents a definite integral calculation from the upper bound $r_i^{ub}$ to the installed capacity $r_i^{max}$;

wherein the constraint conditions are expressed by:

$$0 \leq r_i^{lb} \leq r_i^{ub} \leq r_i^{max}$$

$$\sum_{i=1}^{N} r_i^{lb} \geq R^{lb}$$

$$\sum_{i=1}^{N} r_i^{ub} \leq R^{ub}$$

where $R^{lb}$ represents a lower bound of the whole power generation interval and $R^{ub}$ represents an upper bound of the whole power generation interval.

8. The method of claim 7, wherein decomposing the whole power generation interval scheduled with the decomposition model comprises:
performing a linearization on the objective function in the decomposition model, to obtain a linearized approximate of the objective function;
updating the decomposition model with the linearized approximate of the objective function; and
solving the updated decomposition model by linear programming to obtain an upper bound and a lower bound of the power generation interval of each renewable energy station.

9. The method of claim 8, wherein the linearized approximate of the objective function is expressed by:

$$\min \sum_{i=1}^{N} [s_i + t_i]$$

$$s_i \geq E(UG_i)_{r_i^{lb}=r_{i,k}} + [CDF_i(r_{i,k}) - CDF_i(0)](r_i^{lb} - r_{i,k})$$

$(k = 1, 2, \ldots, K)$ $$t_i \geq E(OG_i)_{r_i^{ub}=r_{i,k}} + [CDF_i(r_{i,k}) - CDF_i(r_i^{max})](r_i^{ub} - r_{i,k})$$

$(k = 1, 2, \ldots, K)$ where $s_i$ represents a linearized approximate of the mathematical expectation $E(UG_i)$ of the under-generation cost of the i-th renewable energy station, $t_i$ represents a linearized approximate of the mathematical expectation $E(OG_i)$ of the over-generation cost of the i-th renewable energy station;

k represents a serial number of linearized sampling points, K represents a number of linearized sampling points, $r_{i,k}$ represents a value of a k-th linearized sampling point at the i-th renewable energy station, and $$E(UG_i)_{r_i^{lb}=r_{i,k}}$$

represents a numerical value of $E(UG_i)$ calculated when a lower bound $r_i^{lb}$ of a power generation interval of the i-th renewable energy station equals to $r_{i,k}$, $$E(OG_i)_{r_i^{ub}=r_{i,k}}$$

represents a numerical value of $E(OG_i)$ calculated when an upper bound $r_i^{ub}$ of a power generation interval of the i-th renewable energy station equals to $r_{i,k}$, and $CDF_i$ represents a cumulative probability density function as an actual power generation amount of the i-th renewable energy station.

* * * * *